Nov. 12, 1940.   R. E. BURNETT   2,221,440
RESINOUS COMPOSITION, METHOD OF MAKING THE
SAME, AND ARTICLE PRODUCED THEREFROM
Filed Feb. 1, 1938

Fig.1.

CONDUCTOR

INSULATION COMPRISING FIBROUS
MATERIAL COATED AND IMPREGNATED
WITH A CONDENSATION PRODUCT OF AN
ALKYL-SUBSTITUTED ARYL ESTER CONTAINING
REACTIVE HALOGEN IN THE ALKYL RADICAL
AND AN AROMATIC COMPOUND HAVING
REACTIVE HYDROGEN ATOMS.

Fig.2.

SHEET OF FIBROUS MATERIAL COATED AND
IMPREGNATED WITH A CONDENSATION
PRODUCT OF AN ALKYL SUBSTITUTED ARYL
ESTER CONTAINING REACTIVE HALOGEN IN
THE ALKYL RADICAL AND AN AROMATIC
COMPOUND HAVING REACTIVE HYDROGEN ATOMS.

Inventor:
Robert E. Burnett,
by Harry E. Dunham
His Attorney.

Patented Nov. 12, 1940

2,221,440

UNITED STATES PATENT OFFICE 2,221,440

RESINOUS COMPOSITION, METHOD OF MAKING THE SAME, AND ARTICLE PRODUCED THEREFROM

Robert E. Burnett, Schenectady, N. Y., assignor to General Electric Company, a corporation of New York Application February 1, 1938, Serial No. 188,087

14 Claims. (Cl. 260—2)

The present invention relates to a composition of matter and to a method of preparing the same. More specifically the invention relates to, and has as a principal object to provide a novel synthetic resin which is particularly adapted to resist combustion in a flame. The scope of the invention also includes articles of manufacture containing the new synthetic material.

I have found that new and useful resinous compositions can be produced by condensing an alkyl-substituted aryl (aromatic) ester, such as the phosphate, containing reactive halogen in the alkyl (aliphatic) radical, with an aromatic compound having reactive hydrogen atoms. By way of illustrating alkyl-substituted aryl esters, that is, alkaryl esters, which may be halogenated in the side chain and the halogenated material used in making the condensation products of this invention, I mention the following examples: tricresyl phosphate, which also may be termed trimethylphenyl phosphate since it contains a methyl radical substituted in a phenyl nucleus, dicresyl monophenyl phosphate, dicresyl monoxenyl phosphate, dicresyl mononaphthyl phosphate, and dicresyl monochlorophenyl phosphate, or mixtures of two or more such substances. Any phosphate or other ester of a similar chemical structure may be used. For practical reasons I prefer to use those esters which are now commercially available, and preferably the phosphates because of the improved flame resistance of the end-products. The alkyl-substituted aryl ester may have in the side chain halogens such as bromine, chlorine, or mixtures thereof, as desired or as conditions may require. I prefer to use an alkyl-substituted aryl ester containing reactive chlorine in the alkyl radical and, specifically, chlorinated tricresyl phosphate.

The reactants are heated together in the presence of a small amount of a catalyst adapted to promote a condensation reaction therebetween. Examples of such catalysts are sulfur, and halides (for example, the bromides or chlorides) of iron, aluminum, tin or zinc. Ferric chloride is the preferred catalyst.

In the accompanying drawing are shown by way of illustration sectional views of different articles containing the new synthetic composition. Fig. 1 is a cross-sectional view of an insulated electrical conductor comprising a conductor core enveloped by insulation comprising fibrous material, such as paper, cotton, spun glass, asbestos, mineral wool, etc., coated and at least partly impregnated with the new resinous composition; and Fig. 2 is a similar view of a sheet of fibrous material coated and partly impregnated with the synthetic resin of this invention.

The following examples are illustrative of how the present invention may be carried into effect:

Example 1

This example illustrates the preparation of a resinous composition comprising a condensation product of tricresyl phosphate containing chlorine in a methyl radical thereof and a different reactive organic substance comprising a mixture of aryl ester, specifically tricresyl phosphate, and an aromatic hydrocarbon compound having at least ten carbon atoms, specifically naphthalene. The aryl ester and aromatic hydrocarbon compound each have in the ring structure of the respective substances at least one reactive hydrogen atom that is capable of splitting off and combining with chlorine in a condensation reaction.

|  | Parts by weight |
|---|---|
| Chlorinated tricresyl phosphate (20 to 25% by weight of chlorine) | 200 |
| Tricresyl phosphate | 83 |
| Naphthalene | 127 |
| Ferric chloride | 2 |

The above components are heated at 150° to 200° C. for about four hours, or longer, until substantially all the hydrochloric acid formed during the reaction has been evolved. Excess naphthalene may be removed, if desired, by blowing air or nitrogen through the molten mixture. The resulting product is a brown, fusible, flexible and flame-resistant resin. It is soluble in such aromatic solvents as benzene, toluene and chlorobenzene, as well as in triaryl phosphates. It is insoluble in petroleum and vegetable oils at ordinary temperatures. It has good oil and water resistance. If necessary to increase its plasticity or flexibility for a particular application, it may be plasticized with triaryl phosphates such as tricresyl phosphate or with other suitable plasticizer. It may be used, for example, as a cable impregnant.

Example 2

|  | Parts by weight |
|---|---|
| Chlorinated tricresyl phosphate (20 to 25% by weight of chlorine) | 200 |
| Monochlorodiphenyl | 300 |
| Ferric chloride | 2 |

The above components are heated at 150° to 200° C. for three and one-half hours or longer, that is, until there is no further passing off of hydrochloric acid from the hot syrup. Upon cooling, the thermoplastic resin thickens to form a dark brown waxy resin. It is suitable for use as a flame-resistant insulating compound. For example, asbestos, spun glass in mat, woven or other form, paper, cloth or other fibrous covered wires or cables may be coated, or impregnated and coated with the compound in molten or solution state, and an improved flame-resisting insulated wire or cable thereby produced.

Example 3

| | Parts by weight |
|---|---|
| Chlorinated tricresyl phosphate (20 to 25% by weight of chlorine) | 200 |
| Diphenyl | 300 |
| Ferric chloride | 2 |

The above components are heated at 150° to 200° C. for about four hours, or longer, until there is no further evolution of hydrochloric acid. Upon cooling, a somewhat brittle dark brown resin is obtained. This resin may be plasticized, for example with an aryl phosphate such as tricresyl phosphate, or with a soft or semi-solid pitch such, for instance, as obtained from petroleum, from coal-tar or from vegetable oil residues. The plasticized resin may be used as a cable impregnant.

Example 4

| | Parts by weight |
|---|---|
| Chlorinated tricresyl phosphate (20 to 25% by weight of chlorine) | 200 |
| Triphenyl phosphate | 300 |
| Ferric chloride | 2 |

The above components are heated at 150° to 200° C. for about fifteen hours, or longer, until substantially all the hydrochloric acid has been evolved. The product is a very sticky, brown syrup which may be used as a flame resistant adhesive. For example, it may be used in bonding together ground cork, powdered asbestos, wood flour, and similar substances, or in uniting superposed layers of paper, cloth, and the like, to form sheet material, gaskets, and other articles of manufacture.

Example 5

| | Parts by weight |
|---|---|
| Chlorinated tricresyl phosphate (20 to 25% by weight of chlorine) | 200 |
| Tricresyl phosphate | 300 |
| Ferric chloride | 2 |

The above components are heated in an open vessel at 150° to 200° C. for about fifteen hours, or longer, until there is no further evolution of hydrochloric acid. The product is a very sticky, brown syrup which may be used as a flame resistant bonding material or adhesive, or as an intermediate for the manufacture of other resinous compositions.

Example 6

This example illustrates the preparation of a composition of matter comprising a resinous condensation product of tricresyl phosphate containing halogen, specifically chlorine, in a methyl radical thereof and a different aromatic compound having more than six carbon atoms, more particularly at least ten carbon atoms, and having in the ring structure at least one reactive hydrogen atom that is capable of splitting off and combining with halogen in a condensation reaction. Specifically, in this example, naphthalene is the aromatic compound which is caused to react with the chlorinated tricresyl phosphate reactant.

| | Parts by weight |
|---|---|
| Chlorinated tricresyl phosphate (20 to 25% by weight of chlorine) | 200 |
| Naphthalene | 300 |
| Ferric chloride | 2 |

The above components are heated for about four hours, or longer, at 150° to 200° C., until substantially all the hydrochloric acid has been evolved. The resulting product is a hard, brittle dark brown resin when cool. It is easily fusible and may be used as a flame resistant sealing wax.

Example 7

| | Parts by weight |
|---|---|
| Chlorinated tricresyl phosphate (20 to 25% by weight of chlorine) | 200 |
| Tricresyl phosphate | 100 |
| Triphenyl phosphate | 100 |
| Ferric chloride | 2 |

The above components are heated at 150° to 200° C. for about five hours, or longer, until substantially all the hydrochloric acid has been liberated. At this point the mass will be in a slightly gelled stage. The resin on cooling is a flexible dark brown substance which is thermoplastic but non-fusible. This material may be extruded on wire or pressed into various shapes.

Example 8

| | Parts by weight |
|---|---|
| Chlorinated tricresyl phosphate (20 to 25% by weight of chlorine) | 200 |
| Ortho-cresol | 200 |
| Ferric chloride | 1 |

The above components are heated for about three or more hours at 150° to 200° C. until substantially all the hydrochloric acid has been evolved. There results a red hard thermoplastic resin which is easily fusible. This substance may be used as a flame resistant impregnant for fibrous materials such as wood, paper and the like.

It will be noted that in each of the foregoing examples a halogenated alkaryl ester, specifically chlorinated tricresyl phosphate, is caused to condense with a different aromatic compound having in the ring structure at least one reactive hydrogen that is capable of splitting off and combining with halogen in a condensation reaction. As pointed out in the second paragraph of this specification, the alkaryl esters employed in carrying this invention into effect contain reactive halogen in the alkyl radical. In obtaining halogenation in the side chain, as later described herein, some halogen also is introduced into the aryl nucleus.

In carrying out the above-described reactions, the reaction vessel advantageously may be provided with an apparatus suitable for the collection of volatile reactants which can be recovered and used again.

Triaryl phosphates containing methyl or other alkyl groups may be halogenated in any suitable way with, for example, bromine or chlorine, or with mixtures of such halogens, and the halogenated product used in making the flame-resisting resins of the present invention. For example, tricresyl phosphate may be directly chlorinated at 100° to 200° C. in the presence of strong visible light or ultra-violet light, which serves to accelerate the chlorination of the methyl groups. In this way reactive groups ($-CH_2Cl$ and perhaps some $-CHCl_2$) are formed, and these subsequently can be joined to any aromatic ring containing reactive hydrogen with the simultaneous elimination of HCl.

An example of the chlorination is as follows: Chlorine gas is slowly bubbled into tricresyl phosphate heated, with vigorous agitation, at about 150° C. for, for example, nine hours in the presence of mild ultra-violet light. In this way a yellow viscous oil containing about 20 to 25 per cent of added chlorine is obtained. It is a highly reactive material and may be chemically combined with aromatic compounds having reactive hydrogen atoms to yield flameproof resinous substances having a wide range of properties.

The degree of halogenation of the alkyl-substituted aryl phosphate, carbonate or other aromatic ester may be varied. In general, the amount of halogen in the side chain groups will range from an average of 1.5 to 4, or more, atoms of halogen per molecule of halogenated ester. In obtaining halogenation in the side chain, some halogen also will enter the benzene ring. The ring halogen remains bound during the condensation reaction with an aromatic compound and is present in the final material. This is desirable, since thereby the flame resistance of the end-product is improved. Hence it is advantageous to introduce into the benzene ring during the halogenation process a substantial amount of halogen. It is preferred that the ratio of ring halogen atoms per molecule to side chain halogen atoms per molecule be of the order of from 1:1 to 1:4. Thus, when the amount of halogen in the side chain groups is an average of 1.5 to 4, or more atoms of halogen per molecule of halogenated ester, the preferred total amount of halogen in the ring and side chain of a halogenated alkyl-substituted aryl ester such, for example, as chlorinated tricresyl phosphate will be an average of approximately 1.9 to 8.0 or more atoms per molecule.

In the case of the chlorination of tricresyl phosphate I have found that up to a total of ten atoms of chlorine per molecule may be introduced into both the side chain and ring, which corresponds to approximately 50 per cent by weight of chlorine. Because of the high reactivity of such a highly chlorinated substance when condensed with an aromatic compound containing reactive hydrogen, it is advantageous to use chlorinated tricresyl phosphate containing less than this amount of total chlorine in the molecule. Best results have been obtained, as described in the examples, with chlorinated tricresyl phosphate containing 20 to 25 per cent by weight of total chlorine.

Almost any compound having at least one benzene nucleus containing reactive hydrogen will react with the halogenated organic ester. However, heavily substituted ring compounds preferably are not used due to the greater difficulty in promoting the reaction. Having chosen a particular halogenated ester as, for instance, chlorinated tricresyl phosphate of a particular extent of chlorination, the properties of the end-product are determined partly by the particular aromatic compound employed and partly by the proportions of reactants. For example, condensing benzene or toluene with chlorinated tricresyl phosphate may yield soft sticky resins. On the other hand, naphthalene, anthracene, diphenyl, chlorodiphenyl, diphenyl oxide, triphenyl phosphate, tricresyl phosphate impart hardness and, in some cases, a non-tacky or even waxy finish to the resin. The most satisfactory proportions of reactants have been found to be, taking as an example chlorinated tricresyl phosphate containing 20 to 25 per cent chlorine, one part by weight of such phosphate with at least one part, and ordinarily not more than two parts, by weight of the aromatic compound. For certain purposes it may be desirable to use more than two parts of the aromatic compound to one part of the phosphate, for example when adhesive types of resinous compositions are to be produced.

Resins produced in accordance with the invention form an inorganic ash or crust when heated in a flame. This is a property of particular advantage when such resin is used as electrical insulation, since it makes it possible to maintain a conductor in service use, in event of fire, even when all organic insulation has been burned off.

By suitably selecting and proportioning the components and by reacting to incipient gelation, resins are produced which, when cold, can be pulverized. The powdered resin may be mixed with a suitable filler as, for example, wood flour, asbestos, spun glass, or other fibrous material to form a molding compound. Thus it is possible in accordance with this invention to prepare resins which, when mixed with wood flour in the ratio of, by weight, 60 per cent resin to 40 per cent wood flour, form compositions that can be molded at 150° C.

A heat-hardenable resinous composition may be prepared by reacting halogenated organic ester such as chlorinated tricresyl phosphate first with an aromatic compound such as phenol, cresol or the like and then with an aldehyde such as formaldehyde. Such resinous compositions are claimed in my copending application Serial No. 359,550, filed October 3, 1940, and assigned to the same assignee as the present invention.

From the foregoing description it will be seen that the present invention provides a process of making a flame-resisting resinous composition which comprises causing to react at an elevated temperature an alkaryl ester containing reactive halogen in the alkyl radical thereof with a different aromatic compound having in the ring structure at least one reactive hydrogen atom that is capable of splitting off and combining with halogen in a condensation reaction, which reaction is carried out in the presence of a condensing agent until there is no further evolution of halogen acid. Figs. 1 and 2 illustrate applications of these new resinous compositions in the production of new and useful articles of manufacture. Fig. 1 shows an insulated electrical conductor wherein the insulation comprises fibrous material coated and impregnated with the resinous condensation products of this invention; and Fig. 2 shows an article of manufacture comprising fibrous material coated and impregnated with these new flame-resisting resins.

Resins of this invention may be mixed with other resinous compositions as, for example, alkyd resins to improve the flame resistance of the latter. The new resins may be used in varnishes and lacquers to provide coating compositions having, when dried, flame-resisting characteristics.

The term "alkaryl" as used herein and in the appended claims is used in its commonly understood sense, that is, as meaning an organic grouping in which an alkyl radical is substituted for a hydrogen atom of an aryl nucleus.

What I claim as new and desire to secure by Letters Patent of the United States, is:

1. A composition of matter comprising a resinous condensation product of an alkaryl ester containing reactive halogen in the alkyl radical thereof and a different aromatic compound having in the ring structure at least one reactive hydrogen atom that is capable of splitting off and combining with halogen in a condensation reaction.

2. A composition of matter comprising a resinous product of condensing an alkaryl phosphate containing reactive halogen in the alkyl radical thereof with a different aromatic compound having in the ring structure at least one reactive hydrogen atom that is capable of splitting off and combining with halogen in a condensation reaction.

3. A composition of matter comprising a resinous condensation product of tricresyl phosphate containing halogen in a methyl radical thereof and a different aromatic compound having in the ring structure at least one reactive hydrogen atom that is capable of splitting off and combining with halogen in a condensation reaction.

4. A composition of matter comprising a resinous condensation product of tricresyl phosphate containing chlorine in a methyl radical thereof and a different aromatic compound having more than six carbon atoms and having in the ring structure at least one reactive hydrogen atom that is capable of splitting off and combining with chlorine in a condensation reaction.

5. A resinous composition comprising a condensation product of tricresyl phosphate containing chlorine in a methyl radical thereof and a different aromatic compound having at least ten carbon atoms and having in the ring structure at least one reactive hydrogen atom that is capable of splitting off and combining with chlorine in a condensation reaction.

6. A resinous composition comprising a condensation product of tricresyl phosphate containing chlorine in a methyl radical thereof and a different reactive organic substance comprising aryl ester having in the ring structure at least one reactive hydrogen atom that is capable of splitting off and combining with chlorine in a condensation reaction.

7. A resinous composition comprising a condensation product of tricresyl phosphate containing chlorine in a methyl radical thereof and a different reactive organic substance comprising a mixture of aryl ester and an aromatic hydrocarbon compound having at least ten carbon atoms, the said aryl ester and aromatic hydrocarbon compound each having in the ring structure of the respective substances at least one reactive hydrogen atom that is capable of splitting off and combining with chlorine in a condensation reaction.

8. A process of making a flame-resisting resinous composition which comprises reacting at an elevated temperature an alkaryl ester containing reactive halogen in the alkyl radical thereof with a different aromatic compound having in the ring structure at least one reactive hydrogen atom that is capable of splitting off and combining with halogen in a condensation reaction, the said reaction being carried out in the presence of a condensing agent until there is no further evolution of halogen acid.

9. An article of manufacture comprising fibrous material coated and impregnated with a resinous condensation product of an alkaryl ester containing reactive halogen in the alkyl radical thereof and a different aromatic compound having in the ring structure at least one reactive hydrogen atom that is capable of splitting off and combining with halogen in a condensation reaction.

10. An insulated electrical conductor wherein the insulation comprises fibrous material coated and impregnated with a resinous product of condensing an alkaryl phosphate containing reactive halogen in the alkyl radical thereof with a different aromatic compound having in the ring structure at least one reactive hydrogen atom that is capable of splitting off and combining with halogen in a condensation reaction.

11. A resinous composition comprising a condensation product of naphthalene and tricresyl phosphate containing chlorine in both phenyl and methyl groupings thereof.

12. A resinous composition comprising a condensation product of tricresyl phosphate and tricresyl phosphate containing chlorine in both phenyl and methyl groupings thereof.

13. A resinous composition comprising a condensation product of tricresyl phosphate containing chlorine in both phenyl and methyl groupings thereof with a mixture comprising tricresyl phosphate and naphthalene.

14. A product comprising a resinous material produced by reacting to resin formation a trialkaryl phosphate containing in the aryl nuclei at least one reactive hydrogen that is capable of splitting off and combining with halogen in a condensation reaction and, in addition to said phosphate, a trialkaryl phosphate halogenated both in the aryl nuclei and in the alkyl side chain thereof, the ratio of aryl halogen atoms to alkyl halogen atoms per molecule of halogenated trialkaryl phosphate being of the order of from 1.1 to 1:4.

ROBERT E. BURNETT.

CERTIFICATE OF CORRECTION.

Patent No. 2,221,440.  November 12, 1940.

ROBERT E. BURNETT.

It is hereby certified that error appears in the printed specification of the above numbered patent requiring correction as follows: Page 4, second column, line 56, claim 14, for "1.1" read --1:1--; and that the said Letters Patent should be read with this correction therein that the same may conform to the record of the case in the Patent Office.

Signed and sealed this 14th day of January, A. D. 1941.

(Seal)

Henry Van Arsdale,
Acting Commissioner of Patents.